July 18, 1944.　　　　W. A. RAY　　　　2,353,848
ELECTROMAGNETICALLY OPERATED VALVE
Filed June 26, 1940　　　2 Sheets-Sheet 1
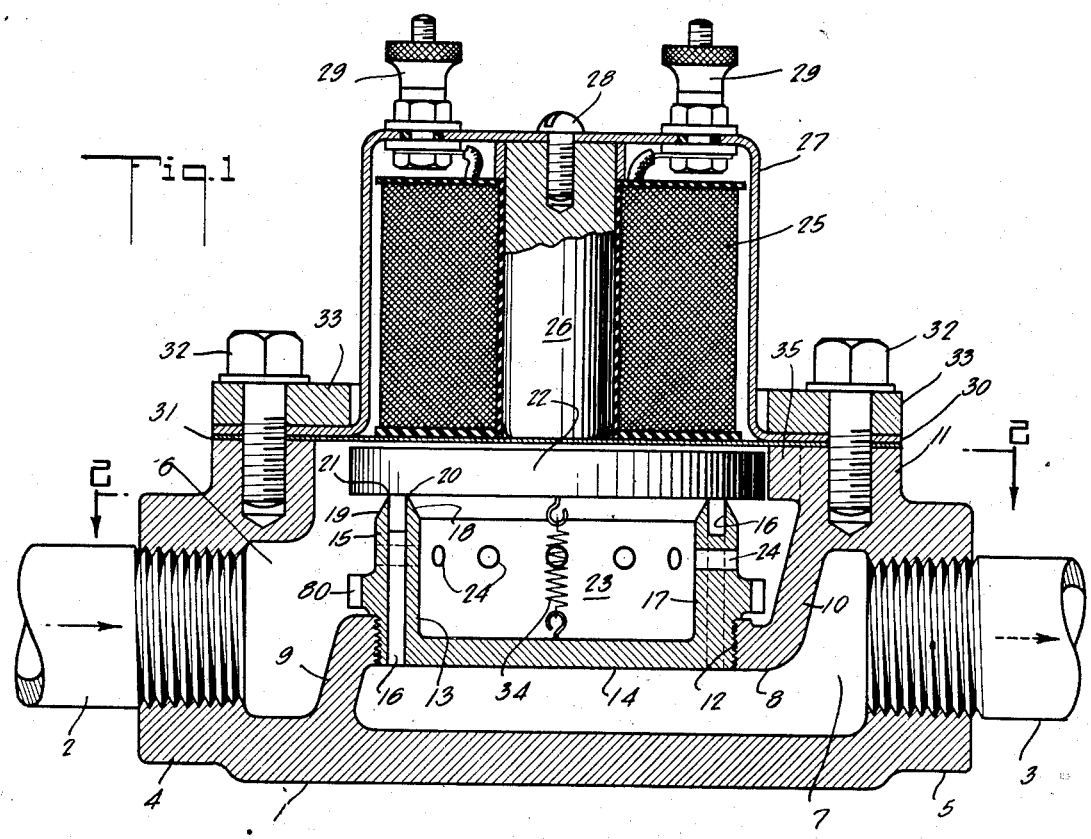
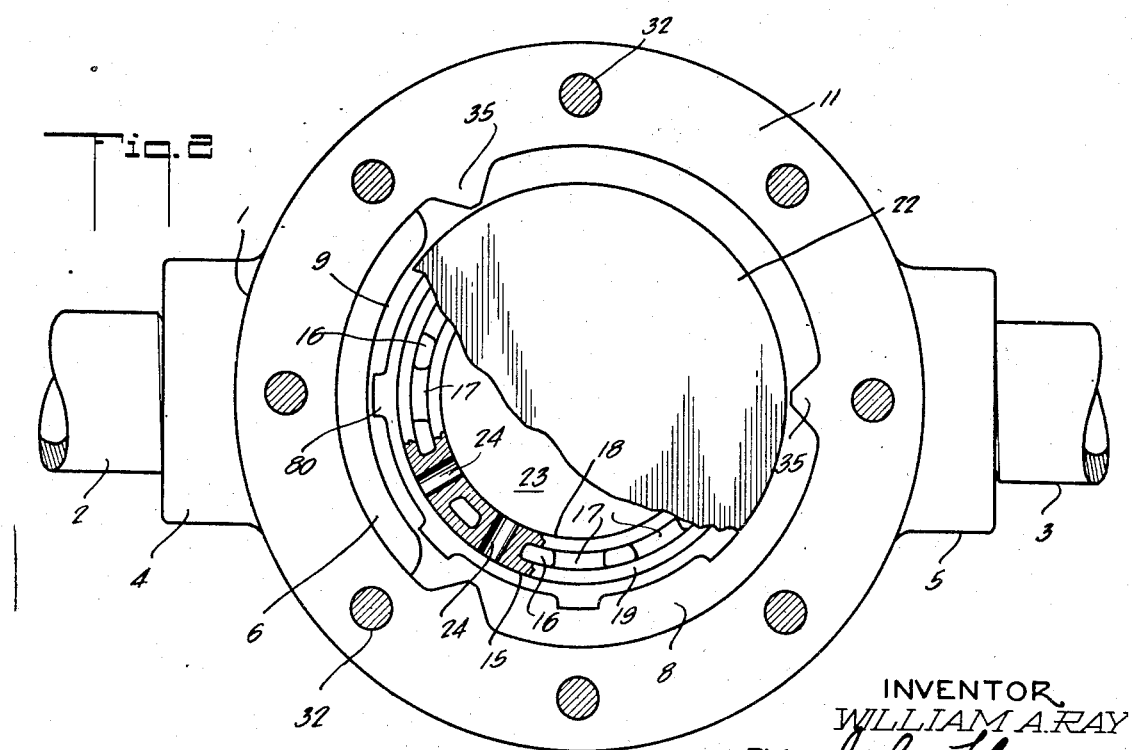
INVENTOR.
WILLIAM A. RAY
BY John Flam
ATTORNEY

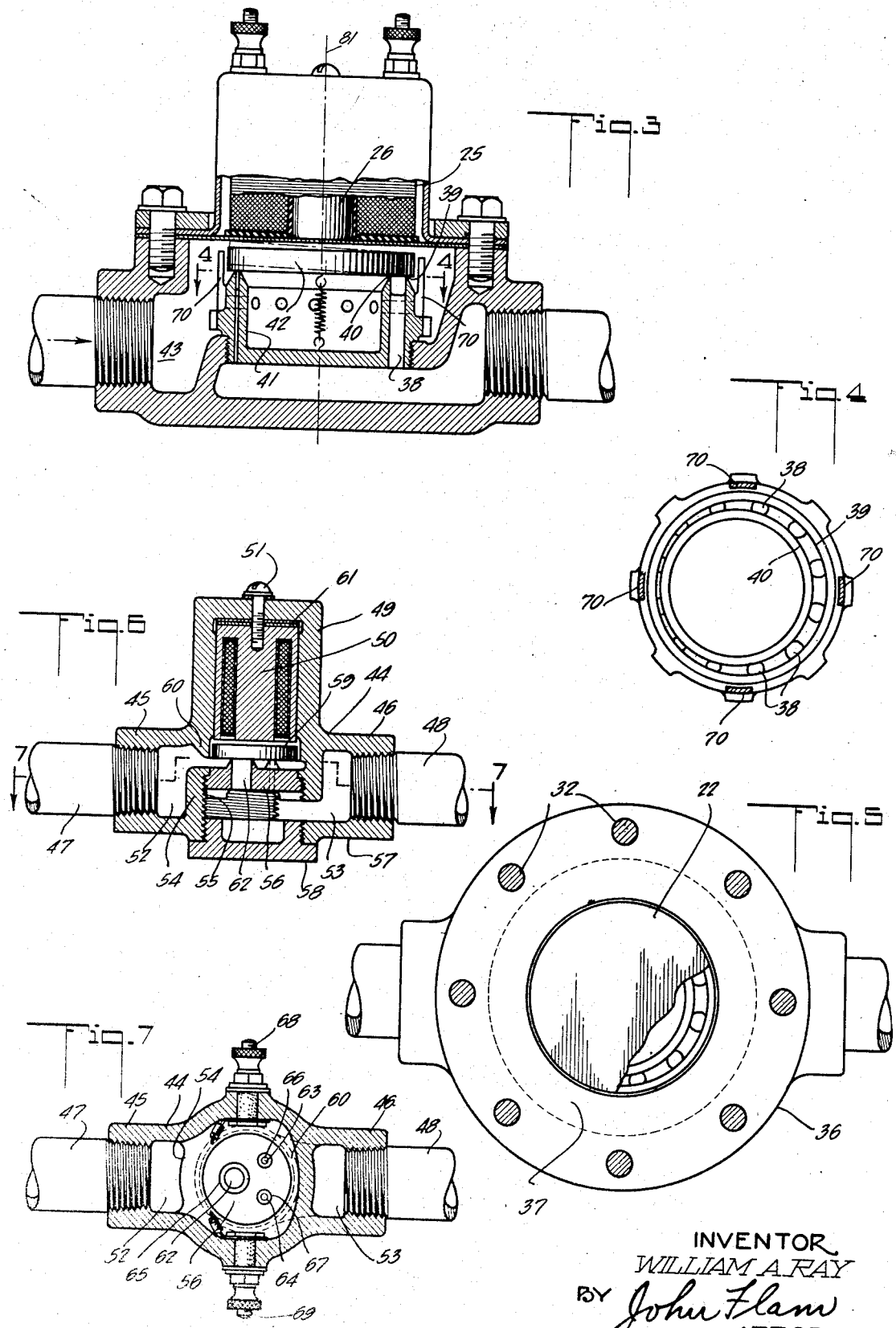

Patented July 18, 1944

2,353,848

UNITED STATES PATENT OFFICE 2,353,848

ELECTROMAGNETICALLY OPERATED VALVE

William A. Ray, Glendale, Calif.

Application June 26, 1940, Serial No. 342,493

4 Claims. (Cl. 137—139)

This invention relates to valves, and more particularly to valves adapted to be operated by electromagnetic means.

Valves of this character, provided with a solenoid coil, are often utilized for the control of fuel to a burner. The coil operates to attract magnetically, a movable valve closure, so as to open the valve. The coil is adapted to be supplied with electrical energy as for example from a thermopile operated by a pilot flame of the burner. The available power from such a source being quite minute at best, care is taken in the design of the valve that the opening of the valve can be accomplished by the available power; and even when the valve closure is urged to its seat by the inlet pressure of the fuel. In a prior application, entitled "Valve structure" filed on March 26, 1940, Serial No. 326,022, in the name of William A. Ray, now Patent No. 2,294,421, granted Sept. 1, 1942, a valve capable of operation in this manner is described. In another prior application entitled "Fluid control valve," filed on June 1, 1939, Serial No. 276,757, in the name of William A. Ray, now Patent No. 2,261,562, granted Nov. 4, 1941, a valve structure is disclosed in which even a small movement of the valve closure from closed to open position results in an abundant flow of fluid past the closure, and without undesired constriction. Thereby the power of the electromagnet necessary to effect this small movement may be effectively attained from the thermopile.

One of the objects of the present invention is to improve in general upon the valve structures disclosed in said prior applications.

In electromagnetically operated valves, the electromagnet structure, being of necessity in close relation to the closure member influenced thereby, is usually made a part of the valve structure. The coil and its core are placed usually in a chamber that is in constant communication with the inlet side of the valve. It is another object of this invention to make it possible to isolate the coil and core chamber from the flow of the fluid, without interfering with the operation of the closure member.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a longitudinal sectional view of a valve structure embodying the invention;

Fig. 2 is a sectional view, taken along plane 2—2 of Fig. 1;

Fig. 3 is a view similar to Fig. 1, of a modified form of the invention;

Fig. 4 is a sectional view taken along plane 4—4 of Fig. 3;

Fig. 5 is a view similar to Fig. 2, of a further modified form of the invention;

Fig. 6 is a longitudinal sectional view of still another form of the invention; and Fig. 7 is a sectional view, taken along plane 7—7 of Fig. 6.

In the form illustrated in Figs. 1 and 2, there is shown a valve body 1 to which an inlet conduit 2 and an outlet conduit 3 may be attached. For this purpose the body 1 may be provided with the oppositely extending bosses 4 and 5, into which the conduits may be threaded.

The inlet conduit 2 is shown as being in communication with an inlet chamber 6. Similarly the outlet conduit 3 is in communication with an outlet chamber 7.

Separating the inlet and outlet chambers 6 and 7 is a wall or partition 8. This wall 8 has a downwardly extending portion 9 joined to the lower wall of the valve body 1, as well as an upwardly extending portion 10 shown as integrally joined to the flange 11 at the upper edge of body 1.

The partition or wall 8 is provided with a threaded aperture 12, in which is supported an externally threaded member 13 that defines one or more port openings for placing the inlet chamber 6 into communication with the outlet chamber 7. This member 13 has a bottom wall 14 as well as a generally cylindrical portion or wall 15 extending upwardly into the chamber 6. The member 13 may if desired be provided with an external interrupted flange 80, facilitating the threading of the member in the aperture 12. The lower surface of the flange 80 serves as a shoulder for limiting the downward movement of the member with respect to the wall 8.

The cylindrical portion 15 of member 13 is provided with an annular port 16 extending longitudinally through the wall 15. The port 16, however, is not continuous, but instead there are a number of integral connections 17 extending across the annular port 16. As shown most clearly in Fig. 1 these integral connections 17 extend from the bottom wall 14 to near the top of the wall 15. In this way a number of unimpeded passageways between the integral connections 17 are formed through the member 13, all opening into a common annular portion adjacent the top of the wall 15.

The upper edge of the wall 15 is formed by the sloping conical surfaces 18 and 19. These conical surfaces define relatively narrow annular valve seats 20 and 21 around the annular port 16. A disk-like closure member 22 is shown as resting upon the annular seats 20 and 21; the communication between inlet chamber 6 and outlet chamber 7 is thus interrupted.

There is a chamber 23 defined by the lower surface of the closure member 22, the bottom wall 14 of member 13 and the side wall 15 thereof. This chamber 23 may be placed in continuous communication with the inlet chamber 6 by the aid of a plurality of apertures 24 passing through the integral connections 17. When the valve closure 22 is lifted off the seats 20 and 21, fluid from the inlet chamber 6 can pass not only past the seat 21 into the port 16, but also past the seat 20 into the port 16. Accordingly the total effective area of the exit opening from the inlet chamber 6 into the port 16, as the closure 22 lifts, is quite large. This is of importance when the available power for lifting the closure 22 from seats 20 and 21 is limited; for then there is imposed a corresponding limit upon the distance through which the closure may be moved.

The power for lifting the valve closure 22 from its seat is provided by energization of an electromagnet coil 25. This coil is shown as disposed around a central magnetic core 26 placed coaxially with the closure 22. The closure is made of good magnetic material, so that magnetization of the core 26 by energization of the coil 25 will operate to lift the closure member 22.

The electromagnet coil 25 is shown as disposed within a sheet metal shell 27, made from magnetic material. The upper end of the core 26 may be attached to the top wall of the shell 27, as by the aid of the screw 28. Binding post structures 29 may be supported on this top wall and appropriately insulated therefrom to form the terminals of the coil 25.

The shell 27 is furthermore provided with the flange 30, adapted to overlie the flange 11 of the body 1. Interposed between the flange 30 and the flange 11 there is placed a thin diaphragm 31 made of non-magnetic material; for example of stainless steel. This diaphragm may be of the order of .005 inches thick. This diaphragm extends between the polar end surface of the core 26 and the closure 22, and serves to seal the valve body 1. Due to the fact that the diaphragm or plate 31 is quite thin, the closure 22 is nevertheless within the operative influence of the core 26 when coil 25 is energized. The diaphragm 31 serves to enclose all of the valve parts and segregate them from the electro-magnet proper. The lower end of core 26 is preferably placed quite closely to the top surface of the diaphragm 31. In this way the resistance of the diaphragm to upward flexure under the influence of the inlet pressures is greatly increased.

The sealing of the valve body 1 may be effected by proper fastening means passing through the flange 30 and the disphragm 31. For example, a number of bolts 32 may be utilized for this purpose. Further to ensure uniform seating and sealing of the flange 30 and diaphragm 31 on the flange 11, a heavy ring 33 may be disposed on top of the flange 30, through which the bolts 32 may also pass.

When the electromagnet coil 25 is deenergized, the weight of the closure 22 moves it to the closed position of Fig. 1. If desired, the closing force may be supplemented as by a tension spring 34 disposed between the closure 22 and the bottom wall 14 of the member 13. It is noted that in addition, the fluid pressure in the inlet chambers 6 and 23 is effective over the annular area of the port 16 for urging the closure 22 upon its seats 20 and 21. In order to restrain the closure 22 against material transverse misalinement, the flange 11 may be provided with a number of inwardly directed guiding projections 35, adapted to have their inner faces of reduced size in closely spaced relation with the cylindrical surface of the closure 22.

When the electromagnet coil 25 is energized, as for example from a pilot burner operated thermopile, the valve closure 22 is attracted by the core 26, and is lifted off its seats 20 and 21. The fluid from the inlet chambers 6 and 23 may then flow past each of the seats 20 and 21 into the port 16, and then downwardly through the wall 15 into the outlet chamber 7.

In the form of the invention illustrated in Fig. 5, provisions are made for reducing the reluctance of the magnetic circuit for the electromagnet structure. For this purpose the valve body 36 is made from magnetic material, such as soft iron. Instead of the few guiding projections 35 illustrated in Fig. 1 for the valve closure 22, an inwardly directed flange 37 is provided, forming a small annular air gap between the flange 37 and the outer periphery of the valve closure 22. In this way the return circuit for the magnetic flux passing through the core 26 may be effected through the guiding flange 37, main flange 11 and flange 30 of the magnetic shell 27.

Care is exercised in so designing the electromagnet and the various parts of the magnetic circuit as to ensure the lifting of the closure 22 when the coil 25 is energized from a low power source such as a thermopile. One way in which the available power may be still more effectively utilized for this purpose is as illustrated in the form of Figs. 3 and 4. In this form, a preliminary tilting of the closure is effected before it is completely lifted off the valve seats. This preliminary tilting causes an equalization of fluid pressures on the top and bottom of the valve closure and therefore reduces the force required to lift the closure completely off its seat.

To effect this result, the annular port 38 (corresponding to port 16 of Fig. 1) is defined by eccentric seats 39 and 40. The port 38 is thus quite narrow in one place and gradually broadens to a maximum width at the diametrically opposite point (Fig. 4). The outer valve seat 39 (which surrounds the inner valve seat 40) is shown in this instance as concentric with the axis of the electromagnet coil 25; and the inner valve seat 40 is shown as eccentric with relation thereto.

The area defining the port 38 is unsymmetrical with respect to the axis of electromagnet core 26; and is therefore likewise unsymmetrical to the axis of the lifting force exerted upon the closure 42. Upon energization of the electromagnet coil 25, the magnetic force acting upon the closure 42 serves to tilt this closure member as illustrated by the dot-and-dash lines of Fig. 3. Tilting is effected because of the relationship of the opposing forces acting on the closure 42. The lifting force can be represented by a line 81 corresponding to the axis of the electromagnet; the forces opposing this lifting force, due to the inlet fluid pressure over the port area, can be combined as a single force operating along a line displaced from the axis 81 toward that side where the port is widest; that is, toward the right of the axis 81. Accordingly when electromagnet coil 25 is energized, the closure tilts in a clockwise direction. In this tilting action, the right hand portions of the closure 42 rest upon a point of the outer seat 39 as a fulcrum. As soon as this tilting begins, the fluid pressures are equalized above and below the closure 42, and the closure is thereupon free to move upwardly under the influence of the magnetism produced by the coil 25.

Due to the provision of the double seats 39 and 40, just as in the form of Fig. 1, a slight upward movement of the closure member 42 serves to provide a large area between the closure and the seats 39 and 40, for the passage of the fluid from the inlet chamber 43 into the port 38.

The guiding of the closure member 42 in this instance is accomplished by the aid of a series of guiding projections 70 formed integral with the member 41.

The tilting of the closure member for thus "cracking" the valve open may be accomplished in other forms of the invention. In the form of the invention illustrated in Figs. 6 and 7, a valve body 44 is shown, preferably made from magnetic material. This valve body has the oppositely extending bosses 45 and 46 for the accommodation respectively of the inlet conduits 47 and 48. In this instance the valve body 44 is provided with an integral hollow cylindrical projection 49 for the accommodation of the ironclad electromagnet structure 50. This electromagnet structure may be fastened to the top wall of the projection 49 as by the aid of the screw 51.

The inlet chamber 52 is shown as separated from the outlet chamber 53 by wall 54. This wall has a threaded aperture 55 in which is accommodated member 56 forming a plurality of valve seats. In order to facilitate assembly of the parts, the threaded aperture 55 continues through the bottom wall 57 of the valve body 44. This threaded aperture may be closed at the bottom by a threaded plug or cover 58.

A closure member 59, in the form of a disk of magnetic material, is placed immediately below the electromagnet 50, and above member 56. It is guided by the flange 60 disposed around the lower edge of the projection 49. This flange 60 serves not only to guide the closure member 59 but also to reduce the magnetic reluctance of the path for the electromagnet 50.

The manner of assembling the device is quite obvious from the foregoing. The electromagnet structure 50 is first placed within the hollow projection 49, through aperture 55. If desired the shims 61 may be inserted for making it possible to adjust the air gap between the core of the electromagnet and the closure member 59. Thereafter the closure member 59 may be inserted through aperture 55. The member 56 may now be threaded in place. Lastly, the cover or plug 58 is assembled.

The member 56 is provided with port apertures 62, 63 and 64 serving to pass fluid from the inlet chamber 52 to the outlet chamber 53 when the closure member 59 is in attracted position. The closure member in deenergized position seats upon the narrow raised portions 65, 66 and 67 surrounding the apertures 62, 63 and 64.

The distribution of the area of the ports 62, 63 and 64 is purposely made such that these areas are unsymmetrical with respect to the axis of the force exerted by the electromagnet 50 upon the closure member 59. Accordingly the fluid pressure acting to seat the closure 59 is unequally distributed about the axis of the electromagnet. There is a greater force urging the closure member upon the seat 65, due to the larger area of the port 62. The first effect of the energization of the electromagnet 50 is to tilt the closure member 59 about a point of the seat 65. As soon as this tilting occurs the pressures on both sides of the closure member 59 are equalized, and the closure member 59 moves upwardly toward the bottom of the center core.

Connections to the electromagnet 50 may be accomplished by the aid of appropriate binding post structures 68 and 69 accommodated by the sides of the hollow portion 49.

What is claimed is:

1. In an electromagnetically operated valve structure, a valve body having an inlet passage as well as an outlet passage, said body also having a wall separating the inlet and the outlet passage, there being a port through the wall for connecting the said passages, and defined by annular-like spaced surfaces forming a pair of raised valve seats in the inlet passage, one valve seat surrounding the other, a closure of magnetic material cooperating with both valve seats to close the port, there being a space beneath the closure and defined by the inner valve seat, said space being in communication with the inlet passage, and an electromagnet for operating said closure, the area of the port being unsymmetrical with respect to the axis of the force exerted upon the closure by the electromagnet.

2. In an electromagnetically operated valve structure, a valve body having an inlet passage as well as an outlet passage, said body also having a wall separating the inlet and the outlet passage, there being a port through the wall for connecting the said passages, and defined by annular-like spaced surfaces forming a pair of raised valve seats in the inlet passage, one valve seat surrounding the others, a closure of magnetic material cooperating with both valve seats to close the port, there being a space beneath the closure and defined by the inner valve seat, said space being in communication with the inlet passage, and an electromagnet for operating said closure, the annular-like surfaces defining the port being non-concentric, whereby the fluid pressures acting to hold the closure upon the seats has a center of force displaced with respect to the axis of the force exerted upon the closure by the electromagnet.

3. In an electromagnetically operated valve structure, a valve body having an inlet passage and an outlet passage, said body also having a wall separating the inlet and outlet passages, there being one or more ports through said wall to establish communication between the inlet and outlet passages, said wall having raised portions adjacent the port or ports to form a seat or seats, a valve closure cooperating with the seat or seats to close the ports, and an electromagnet for operating the closure, the port area or areas being so distributed with relation to the axis of the force exerted by the electromagnet upon the closure that the said closure is caused to be tilted upon a point of a seat as a fulcrum.

4. In an electromagnetically operated valve structure, a valve body having an inlet passage and an outlet passage, said body also having a wall separating the inlet and outlet passages, said wall forming raised valve seats respectively around each port, a valve closure cooperating with the seats to close the ports, and an electromagnet for operating the closure, the port areas being so distributed with relation to the axis of the force exerted by the electromagnet upon the closure that the said closure is caused to be tilted upon a point of a seat as a fulcrum.

WILLIAM A. RAY.